US012807831B2

(12) United States Patent
Youn et al.

(10) Patent No.: US 12,807,831 B2
(45) Date of Patent: Nov. 24, 2026

(54) INK COMPOSITION, LAYER USING THE SAME, AND ELECTROPHORESIS APPARATUS, AND DISPLAY DEVICE COMPRISING THE SAME

(71) Applicant: Samsung Display Co., LTD., Yongin-si (KR)

(72) Inventors: Jinsuop Youn, Yongin-si (KR); Kyuyoung Kim, Yongin-si (KR); Misun Kim, Yongin-si (KR); Minjun Kim, Yongin-si (KR); Bongyong Kim, Yongin-si (KR); Youngmin Kim, Yongin-si (KR); Janghyuk Kim, Yongin-si (KR); Young Woo Park, Yongin-si (KR); Chuljin Park, Yongin-si (KR); Heeje Woo, Yongin-si (KR); Eun Sun Yu, Yongin-si (KR); Jeongwoo Lee, Yongin-si (KR); Hyunmoo Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 521 days.

(21) Appl. No.: 18/336,182

(22) Filed: Jun. 16, 2023

(65) Prior Publication Data

US 2023/0407122 A1 Dec. 21, 2023

(30) Foreign Application Priority Data

Jun. 17, 2022 (KR) ........................ 10-2022-0074407

(51) Int. Cl.

*H01B 1/20* (2006.01)
*C09D 11/36* (2014.01)

(Continued)

(52) U.S. Cl.

CPC .............. *C09D 11/38* (2013.01); *C09D 11/36* (2013.01); *C09D 11/52* (2013.01); *G02F 1/167* (2013.01); *H01B 1/20* (2013.01)

(58) Field of Classification Search

CPC ... H01B 1/00; H01B 1/20; C09D 5/24; C09D 11/36; C09D 11/38; C09D 11/52; G02F 1/167

See application file for complete search history.

(56) References Cited

U.S. PATENT DOCUMENTS

| | | | |
|---|---|---|---|
| 8,592,511 | B2 | 11/2013 | Gonen Williams et al. |
| 8,883,903 | B2 | 11/2014 | Gonen Williams et al. |

(Continued)

FOREIGN PATENT DOCUMENTS

| | | |
|---|---|---|
| EP | 2 913 355 | 9/2015 |
| JP | 2010-271638 | 12/2010 |

(Continued)

OTHER PUBLICATIONS

Liu et al "Self-assembly of inorganic nanorods", Chem. Soc. Rev., 2011, 40, 656-671.*

(Continued)

*Primary Examiner* — Mark Kopec

(74) *Attorney, Agent, or Firm* — Womble Bond Dickinson (US) LLP

(57) ABSTRACT

Embodiments provide an ink composition, a layer manufactured using the ink composition, and an electrophoresis apparatus and a display device including the same. The ink composition includes a semiconductor nanorod including at least one functional group each independently represented by one of Chemical Formula 1-1 to Chemical Formula 1-3, and a solvent. Chemical Formula 1-1 to Chemical Formula 1-3 are explained in the specification:

(Continued)

[Chemical Formula 1-1]

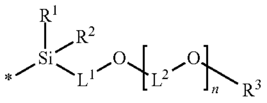

[Chemical Formula 1-2]

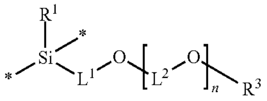

[Chemical Formula 1-3]

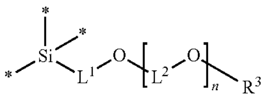

20 Claims, 1 Drawing Sheet

(51) Int. Cl.

| | |
|---|---|
| ***C09D 11/38*** | (2014.01) |
| ***C09D 11/52*** | (2014.01) |
| ***G02F 1/167*** | (2019.01) |

(56) References Cited

U.S. PATENT DOCUMENTS

| | | | |
|---|---|---|---|
| 8,920,675 B2 * | 12/2014 | Xu ........................ | B82Y 30/00 252/301.36 |
| 9,202,688 B2 | 12/2015 | Gonen Williams et al. | |
| 9,328,432 B2 | 5/2016 | Gonen Williams et al. | |
| 9,617,657 B2 | 4/2017 | Xu et al. | |
| 9,856,581 B2 * | 1/2018 | Gonen Williams .... | B82Y 30/00 |
| 10,000,665 B2 | 6/2018 | Grottenmuller et al. | |
| 10,753,012 B2 | 8/2020 | Xu et al. | |
| 12,344,752 B2 * | 7/2025 | Otsuki .................. | C09D 11/38 |
| 2018/0023212 A1 | 1/2018 | Gonen Williams et al. | |
| 2021/0238435 A1 | 8/2021 | Sim et al. | |
| 2022/0040914 A1 | 2/2022 | Deore et al. | |
| 2022/0334291 A1 | 10/2022 | Deore et al. | |
| 2022/0416424 A1 | 12/2022 | Deore et al. | |
| 2023/0021553 A1 | 1/2023 | Sampson et al. | |
| 2023/0320140 A1 | 10/2023 | Kishimoto et al. | |

FOREIGN PATENT DOCUMENTS

| | | |
|---|---|---|
| JP | 2013-195696 | 9/2013 |
| JP | 2018-146858 | 9/2018 |
| JP | 2019-512720 | 5/2019 |
| KR | 10-2013-0076936 | 7/2013 |
| KR | 10-2013-0105291 | 9/2013 |
| KR | 10-2015-0075154 | 7/2015 |
| KR | 10-2016-0020490 | 2/2016 |
| KR | 10-2020-0090033 A | 7/2020 |
| KR | 10-2021-0098589 A | 8/2021 |
| KR | 10-2021-0114761 | 9/2021 |
| KR | 10-2021-0133044 | 11/2021 |
| WO | 2021/044261 | 3/2021 |
| WO | 2022/049096 | 3/2022 |

OTHER PUBLICATIONS

English language machine translation of KR 10-2021-0114761 (pub date Sep. 21, 2024).*

Korean International Search Report for International Application No. PCT/KR2023/008395, dated Sep. 25, 2023.

Korean Notice of Allowance dated Sep. 24, 2025, issued in corresponding Korean Patent Application No. 10-2022-0074407 (7 pages), (No English language translation provided).

* cited by examiner

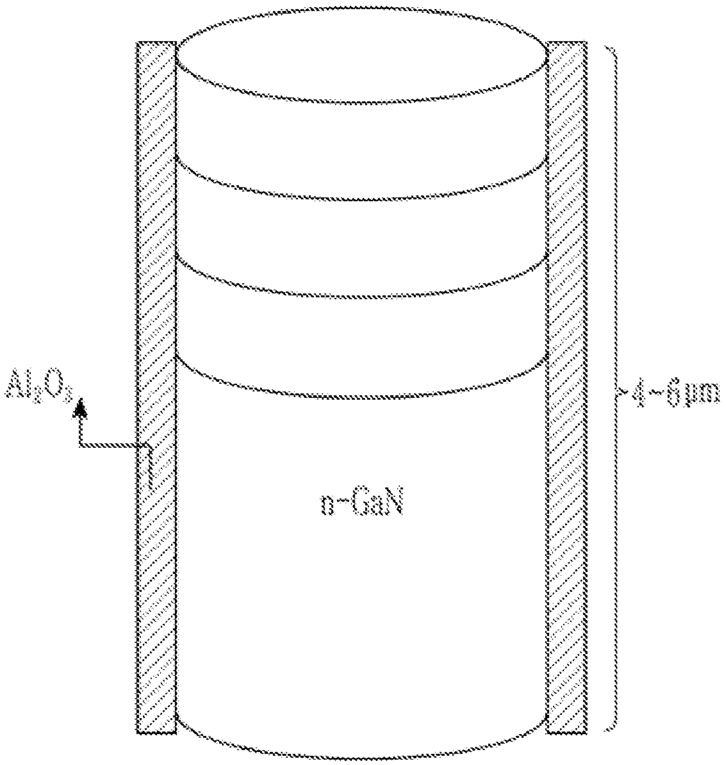
Al2O3
n-GaN
4~6μm

INK COMPOSITION, LAYER USING THE SAME, AND ELECTROPHORESIS APPARATUS, AND DISPLAY DEVICE COMPRISING THE SAME

CROSS-REFERENCE TO RELATED APPLICATION(S)

This application claims priority to and benefits of Korean Patent Application No. 10-2022-0074407 under 35 U.S.C. § 119, filed on Jun. 17, 2022, in the Korean Intellectual Property Office, the entire contents of which are incorporated herein by reference.

BACKGROUND

1. Technical Field

The disclosure relates to an ink composition, a layer using the same, an electrophoresis apparatus, and a display device including the same.

2. Description of the Related Art

Light emitting devices (LEDs) have been actively developed since 1992 when Nakamura and others from Japanese Nichia Corp. succeeded in fusing a high-quality single crystal GaN nitride semiconductor by applying a low temperature GaN compound buffer layer. An LED is a semiconductor device that converts electric signals into light having wavelengths in a desired region by using characteristics of a compound semiconductor, which has a structure in which n-type semiconductor crystals in which carriers are electrons and a p-type semiconductor crystal in which carriers are holes, are combined with each other.

LEDs have high light conversion efficiency and thus consumes very little energy and has a semi-permanent lifespan, and is also environmentally friendly and thus is called a revolution of light as a green material. Recently, high luminance red, orange, green, blue, and white LEDs have been developed with the development of compound semiconductor technology and are being applied in many fields such as traffic lights, mobile phones, car headlights, outdoor billboards, LCD BLU (back light unit), and indoor/outdoor lighting, which keeps being actively researched at home and abroad. For example, a GaN-based compound semiconductor having a wide bandgap is a material used to manufacture an LED semiconductor emitting light in green, blue, and ultraviolet (UV) regions, and since a blue LED device is used to manufacture a white LED device, a great deal of research is being conducted on this technology.

Studies on ultra-small LED devices having a nanometer or micrometer unit size are being actively conducted, and in addition, studies for utilizing these ultra-small LED devices in lighting and displays are being continuously made. In these studies, electrodes capable of applying power to the ultra-small LED devices, disposition of the electrodes for reducing a space occupied by the electrodes, a method of mounting the ultra-small LED devices on the disposed electrodes, and the like are continuously attracting attention.

Among these, the method of mounting the ultra-small LED devices on the disposed electrodes still have difficulties of disposing and mounting the ultra-small LED devices on the electrodes as intended due to size limitations of the ultra-small LED devices. The reason is that the ultra-small LED devices are nano-scale or micro-scale and thus may not be disposed and mounted by hand one by one on a target electrode region.

Recently, as the demand for the nano-scale ultra-small LED devices is increasing, an attempt to manufacture a nano-scale GaN-based or InGaN-based compound semiconductor into a rod has been made, but there is a problem that dispersion stability of a nanorod itself in a solvent (or a polymerizable compound) is greatly deteriorated. Until now, there has been no introduction of a technology of improving the dispersion stability of the semiconductor nanorods in a solvent (or a polymerizable compound). Therefore, research on a curable composition including semiconductor nanorods capable of improving the dispersion stability of semiconductor nanorods in a solvent (or polymerizable compound) and realizing a high dielectrophoresis rate is ongoing.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

An embodiment provides an ink composition having excellent electrophoretic characteristics of semiconductor nanorods.

Another embodiment provides a layer manufactured using the ink composition.

Another embodiment provides an electrophoretic device and a display device including the layer.

An embodiment provides an ink composition which may include: a semiconductor nanorod including at least one functional group each independently represented by one of Chemical Formula 1-1 to Chemical Formula 1-3; and a solvent.

[Chemical Formula 1-1]

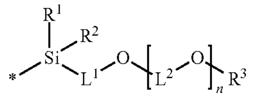

[Chemical Formula 1-2]

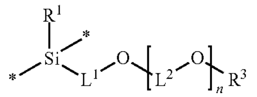

[Chemical Formula 1-3]

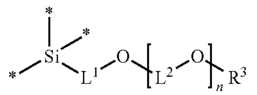

In Chemical Formula 1-1 to Chemical Formula 1-3, $R^1$ to $R^3$ may each independently be hydrogen, a substituted or unsubstituted $C_1$ to $C_{20}$ alkyl group, a substituted or unsubstituted $C_1$ to $C_{20}$ alkoxy group, or a substituted or unsubstituted $C_6$ to $C_{20}$ aryl group, $L^1$ and $L^2$ may each independently be a substituted or unsubstituted $C_1$ to $C_{20}$ alkylene group, n may be an integer from 0 to 20, and

* represents a bond to the semiconductor nanorod.

In an embodiment, $L^1$ and $L^2$ may each independently be an unsubstituted $C_1$ to $C_{20}$ alkylene group.

In an embodiment, $L^1$ and $L^2$ may each independently be represented by Chemical Formula L-1 or Chemical Formula L-2.

[Chemical Formula L-1]

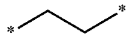

[Chemical Formula L-2]

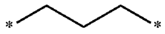

In Chemical Formula L-1 and Chemical Formula L-2,

* indicates a bonding site to a neighboring atom.

In an embodiment, $L^1$ and $L^2$ may each independently be a substituted $C_1$ to $C_{20}$ alkylene group.

In an embodiment, $L^1$ and $L^2$ may each independently be represented by one of Chemical Formula L-3 to Chemical Formula L-7.

[Chemical Formula L-3]

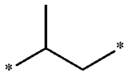

[Chemical Formula L-4]

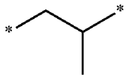

[Chemical Formula L-5]

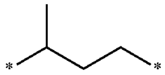

[Chemical Formula L-6]

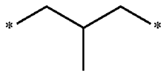

[Chemical Formula L-7]

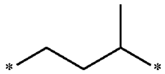

In Chemical Formula L-3 to Chemical Formula L-7,

* indicates a bonding site to a neighboring atom.

In an embodiment, $R^1$ and $R^2$ may each independently be a substituted or unsubstituted $C_1$ to $C_{20}$ alkoxy group.

In an embodiment, $R^3$ may be a substituted or unsubstituted $C_1$ to $C_{20}$ alkyl group.

In an embodiment, the semiconductor nanorod may have a diameter in a range of about 300 nm to about 900 nm.

In an embodiment, the semiconductor nanorod may have a length in a range of about 4 μm to about 6 μm.

In an embodiment, the semiconductor nanorod may include a GaN-based compound, an InGaN-based compound, or any combination thereof.

In an embodiment, the semiconductor nanorod may have a surface coated with a metal oxide.

In an embodiment, the metal oxide may include alumina, silica, or any combination thereof.

In an embodiment, the at least one functional group each independently represented by Chemical Formula 1-1 to Chemical Formula 1-3 may be linked to the metal oxide coating layer on the surface of the semiconductor nanorod.

In an embodiment, an amount of the semiconductor nanorod in the ink composition may be in a range of about 0.01 wt % to about 10 wt %, based on a total amount of the ink composition.

In an embodiment, the solvent may be a citrate-based solvent.

In an embodiment, the ink composition may further include: malonic acid; 3-amino-1,2-propanediol; a silane-based coupling agent; a leveling agent; a fluorine-based surfactant; or any combination thereof.

In an embodiment, the ink composition may be an ink composition for an electrophoresis apparatus.

Another embodiment provides a layer which may be manufactured using the ink composition.

Another embodiment provides an electrophoresis apparatus which may include the layer.

Another embodiment provides a display device which may include the layer.

Other embodiments may be included in the following detailed description.

The ink composition including the semiconductor nanorod may provide a curable composition having excellent electrophoretic characteristics.

It is to be understood that the embodiments above are described in a generic and explanatory sense only and not for the purpose of limitation, and the disclosure is not limited to the embodiments described above.

BRIEF DESCRIPTION OF THE DRAWINGS

The accompanying drawings are included to provide a further understanding of the embodiments, and are incorporated in and constitute a part of this specification.

The drawings illustrate embodiments of the disclosure and principles thereof. The above and other aspects and features of the disclosure will become more apparent by describing in detail embodiments thereof with reference to the accompanying drawings, in which:

The FIGURE is a schematic cross-sectional view of a semiconductor nanorod used in a curable composition according to an embodiment.

DETAILED DESCRIPTION OF THE EMBODIMENTS

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, the sizes, thicknesses, ratios, and dimensions of the elements may be exaggerated for ease of description and for clarity. Like numbers and/or like reference characters refer to like elements throughout.

In the description, it will be understood that when an element (or region, layer, part, etc.) is referred to as being "on", "connected to", or "coupled to" another element, it can be directly on, connected to, or coupled to the other element, or one or more intervening elements may be present therebetween. In a similar sense, when an element (or region, layer, part, etc.) is described as "covering" another element, it can directly cover the other element, or one or more intervening elements may be present therebetween.

In the description, when an element is "directly on," "directly connected to," or "directly coupled to" another element, there are no intervening elements present. For example, "directly on" may mean that two layers or two elements are disposed without an additional element such as an adhesion element therebetween.

In the specification, the word "on" or "above" means positioned or disposed on or below the object portion, and does not necessarily mean positioned or disposed on the upper side of the object portion based on a gravitational direction.

It will be understood that the terms "connected to" or "coupled to" may refer to a physical, electrical and/or fluid connection or coupling, with or without intervening elements.

As used herein, the expressions used in the singular such as "a," "an," and "the," are intended to include the plural forms as well, unless the context clearly indicates otherwise.

As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or".

In the specification and the claims, the term "at least one of" is intended to include the meaning of "at least one selected from the group consisting of" for the purpose of its meaning and interpretation. For example, "at least one of A, B, and C" may be understood to mean A only, B only, C only, or any combination of two or more of A, B, and C, such as ABC, ACC, BC, or CC. When preceding a list of elements, the term, "at least one of," modifies the entire list of elements and does not modify the individual elements of the list.

It will be understood that, although the terms first, second, etc. may be used herein to describe various elements, these elements should not be limited by these terms. These terms are only used to distinguish one element from another element.

Thus, a first element could be termed a second element without departing from the teachings of the disclosure. Similarly, a second element could be termed a first element, without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "about" or "approximately" as used herein is inclusive of the stated value and means within an acceptable range of deviation for the recited value as determined by one of ordinary skill in the art, considering the measurement in question and the error associated with measurement of the recited quantity (i.e., the limitations of the measurement system). For example, "about" may mean within one or more standard deviations, or within +20%, 10%, or ±5% of the stated value.

It should be understood that the terms "comprises," "comprising," "includes," "including," "have," "having," "contains," "containing," and the like are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

As used herein, when a specific definition is not otherwise provided, an "alkyl group" refers to a $C_1$ to $C_{20}$ alkyl group, an "alkenyl group" refers to a $C_2$ to $C_{20}$ alkenyl group, a "cycloalkenyl group" refers to a $C_3$ to $C_{20}$ cycloalkenyl group, a "heterocycloalkenyl group" refers to a $C_3$ to $C_{20}$ heterocycloalkenyl group, an "aryl group" refers to a $C_6$ to $C_{20}$ aryl group, an "arylalkyl group" refers to a $C_6$ to $C_{20}$ arylalkyl group, an "alkylene group" refers to a $C_1$ to $C_{20}$ alkylene group, an "arylene group" refers to a $C_6$ to $C_{20}$ arylene group, an "alkylarylene group" refers to a $C_6$ to $C_{20}$ alkylarylene group, a "heteroarylene group" refers to a $C_3$ to $C_{20}$ heteroarylene group, and an "alkoxylene group" refers to a $C_1$ to $C_{20}$ alkoxylene group.

As used herein, when a specific definition is not otherwise provided, "substituted" may refer to substitution with a halogen atom (F, $C_1$, Br, I), a hydroxy group, a $C_1$ to $C_{20}$ alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, phosphoric acid or a salt thereof, a $C_1$ to $C_{20}$ alkyl group, a $C_2$ to $C_{20}$ alkenyl group, a $C_2$ to $C_{20}$ alkynyl group, a $C_6$ to $C_{20}$ aryl group, a $C_3$ to $C_{20}$ cycloalkyl group, a $C_3$ to $C_{20}$ cycloalkenyl group, a $C_3$ to $C_{20}$ cycloalkynyl group, a $C_2$ to $C_{20}$ heterocycloalkyl group, a $C_2$ to $C_{20}$ heterocycloalkenyl group, a $C_2$ to $C_{20}$ heterocycloalkynyl group, a $C_3$ to $C_{20}$ heteroaryl group, or any combination thereof, instead of at least one hydrogen.

As used herein, when a specific definition is not otherwise provided, "hetero" may refer to one substituted with at least one heteroatom of N, O, S, and P in a chemical formula.

As used herein, when a specific definition is not otherwise provided, "(meth)acrylate" may refer to both "acrylate" and "methacrylate," and "(meth)acryl-based" may refer to both "acryl-based" and "methacryl-based."

As used herein, when a specific definition is not otherwise provided, the term "combination" may refer to mixing or copolymerization.

As used herein, unless a specific definition is otherwise provided, a hydrogen atom may be bonded at a position when a chemical bond is not drawn where it is supposed to be given.

In this specification, a semiconductor nanorod may refer to a rod-shaped semiconductor having a nano-sized diameter.

As used herein, when a specific definition is not otherwise provided, the symbol "*" represents a bonding site to a neighboring atom in a corresponding formula or moiety.

An ink composition according to an embodiment may include: a semiconductor nanorod including at least one functional group each independently represented by one of Chemical Formula 1-1 to Chemical Formula 1-3; and a solvent.

[Chemical Formula 1-1]

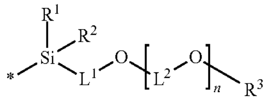

[Chemical Formula 1-2]

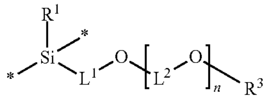

[Chemical Formula 1-3]

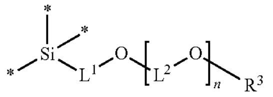

In Chemical Formula 1-1 to Chemical Formula 1-3,

- $R^1$ to $R^3$ may each independently be hydrogen, a substituted or unsubstituted $C_1$ to $C_{20}$ alkyl group, a substituted or unsubstituted $C_1$ to $C_{20}$ alkoxy group, or a substituted or unsubstituted $C_6$ to $C_{20}$ aryl group,
- $L^1$ and $L^2$ may each independently be a substituted or unsubstituted $C_1$ to $C_{20}$ alkylene group,
- n may be an integer from 0 to 20, and
- * represents a bond to the semiconductor nanorod.

Studies on various concepts having effects of improving energy efficiency and preventing efficiency drop of conventional LEDs such as micro LED, mini LED, and the like have been actively conducted. Among them, alignment (electrophoresis) of InGaN-based nanorod LEDs using an electric field draws attention as a method of dramatically reducing complex and expensive process costs of the micro LED, the mini LED, and the like.

However, organic solvents (PGMEA, GBL, PGME, ethyl acetate, IPA, and the like) which are conventionally used in display and electronic technologies have low viscosity and therefore inorganic nanorod particles having a high density may be sedimented too quickly and thus agglomerate. Such organic solvents may quickly volatize and thus contribute to poor alignment characteristics during a solvent drying step after dielectrophoresis. In the related art, there has been an effort to change the composition of a solvent to resolve the aforementioned problem. However, embodiments provide a novel solution to the aforementioned problem by surface-treating a semiconductor nanorod to ensure excellent dispersion stability in an organic solvent, thereby improving precipitation speed and dielectrophoresis alignment characteristics.

Hereinafter, each component is described in detail.

Semiconductor Nanorod

The semiconductor nanorod may be surface-treated by using the compound represented by one of Chemical Formula 1-1 to Chemical Formula 1-3 to increase dispersion stability in the organic solvents and greatly improve a precipitation speed and dielectrophoresis alignment characteristics.

In an embodiment, $L^1$ and $L^2$ may each independently be an unsubstituted $C_1$ to $C_{20}$ alkylene group. In an embodiment, $L^1$ and $L^2$ may each independently be represented by Chemical Formula L-1 or Chemical Formula L-2, but are not necessarily limited thereto.

[Chemical Formula L-1]

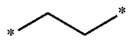

-continued

[Chemical Formula L-2]

In Chemical Formula L-1 and Chemical Formula L-2, * indicates a bonding site to a neighboring atom.

In an embodiment, $L^1$ and $L^2$ may each independently be a substituted $C_1$ to $C_{20}$ alkylene group. In an embodiment, $L^1$ and $L^2$ may each independently be represented by any one of Chemical Formula L-3 or Chemical Formula L-7, but are not necessarily limited thereto.

[Chemical Formula L-3]

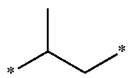

[Chemical Formula L-4]

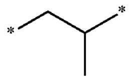

[Chemical Formula L-5]

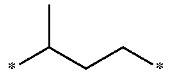

[Chemical Formula L-6]

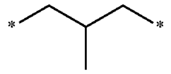

[Chemical Formula L-7]

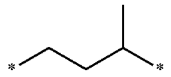

In Chemical Formula L-3 to L-7, * indicates a bonding site to a neighboring atom.

For example, the functional group represented by one of Chemical Formula 1-1 to Chemical Formula 1-3 may be a silane group including a substituted or unsubstituted alkoxylene group. For example, the silane group including a substituted or unsubstituted alkoxylene group may be a siloxane group including a substituted or unsubstituted alkoxylene group. The semiconductor nanorods surface-treated with such a functional group may have significantly better dispersion stability in organic solvents than when the functional group is not surface-treated or the surface is treated with a functional group that does not include a substituted or unsubstituted alkoxylene group. As a result, it can greatly affect the improvement of dielectrophoretic characteristics of the ink composition.

In an embodiment, $R^1$ and $R^2$ may each independently be a substituted or unsubstituted $C_1$ to $C_{20}$ alkoxy group.

In an embodiment, $R^3$ may be a substituted or unsubstituted $C_1$ to $C_{20}$ alkyl group.

In an embodiment, the semiconductor nanorod may include a GaN-based compound, an InGaN-based compound, or any combination thereof. In an embodiment, the semiconductor nanorod may have a surface coated with a metal oxide.

For the dispersion stability of the semiconductor nanorod ink solution (semiconductor nanorod+solvent), a time of about 3 hours may usually be required, which is an extremely insufficient time to perform a large-area inkjet process. However, by coating the surface of the semiconductor nanorod with a metal oxide including alumina, silica, or any combination thereof to form a coating layer or an insulating layer ($Al_2O_3$ or $SiO_x$), compatibility with a solvent described later may be maximized.

For example, the coating layer or the insulating layer coated with the metal oxide may have a thickness in a range of about 40 nm to about 60 nm.

In an embodiment, the at least one functional group each independently represented by one of Chemical Formula 1-1 to Chemical Formula 1-3 may be linked to a metal oxide coating layer or insulating layer on the surface of the semiconductor nanorod. Since the compatibility with the solvent described later becomes very excellent, both the dispersion stability of the semiconductor nanorods and the dielectrophoretic characteristics of the ink composition may be greatly improved.

The semiconductor nanorod may include an n-type confinement layer and a p-type confinement layer, and a multiquantum well active portion (MQW active region; multi-quantum well active region) may be located between the n-type confinement layer and the p-type confinement layer.

In an embodiment, the semiconductor nanorod may have a diameter in a range of about 300 nm to about 900 nm. For example, the semiconductor nanorod may have a diameter in a range of about 600 nm to about 700 nm.

In an embodiment, the semiconductor nanorod may have a length in a range of about 4 μm to about 6 μm.

For example, when the semiconductor nanorod includes an alumina insulating layer, it may have a density in a range of about 5 $g/cm^3$ to about 6 $g/cm^3$.

For example, the semiconductor nanorod may have a mass in a range of about $1\times10^{-13}$ g to about $1\times10^{-1}$ g.

When the semiconductor nanorods have the above diameter, length, density, and type, surface coating of the metal oxide may be facilitated, and dispersion stability of the semiconductor nanorods may be maximized.

An amount of the semiconductor nanorod in the ink composition may be in a range of about 0.01 wt % to about 10 wt %, based on a total amount of the ink composition. For example, an amount of the semiconductor nanorod in the ink composition may be in a range of about 0.01 wt % to about 5 wt %, based on a total amount of the ink composition. In an embodiment, an amount of the semiconductor nanorods in the ink composition may be in a range of about 0.01 parts by weight to about 0.5 parts by weight, based on 100 parts by weight of the solvent in the ink composition. For example, an amount of the semiconductor nanorods in the ink composition may be in a range of about 0.01 parts by weight to about 0.1 parts by weight, based on 100 parts by weight of the solvent in the ink composition. When an amount of the semiconductor nanorod is included within any of the above ranges, dispersibility in the ink is good, and the manufactured pattern may have excellent luminance.

Solvent

Organic solvents such as propylene glycol monomethyl ether acetate (PGMEA), γ-butyrolactone (GBL), polyethylene glycol methyl ether (PGME), ethylacetate, isopropyl alcohol (IPA), and the like, which have been used in conventional displays and electronic materials, have so low viscosity that inorganic material nanorod particles with high density are too quickly sedimented, resulting in unsatisfactory dielectrophoretic characteristics. According to an embodiment, the above problems may be solved through surface treatment of the semiconductor nanorod, but if there is a solvent capable of imparting sedimentation stability to the semiconductor nanorod, it may be more desirable to use the solvent as the solvent.

In an embodiment, the solvent may be a citrate-based solvent, but the solvent is not necessarily limited thereto.

For example, the solvent may have a viscosity of greater than or equal to about 3 cps at 50° C.

For example, the solvent may include a compound represented by Chemical Formula 2 or Chemical Formula 3.

[Chemical Formula 2]

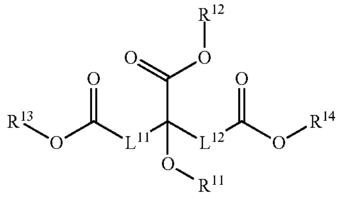

[Chemical Formula 3]

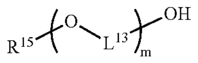

In Chemical Formula 2 and Chemical Formula 3, $R^{11}$ may be a hydrogen atom or *—C(=O)R' (wherein R' may be a hydrogen atom or a substituted or unsubstituted $C_1$ to $C_{10}$ alkyl group), $R^{12}$ to $R^{14}$ may each independently be a substituted or unsubstituted $C_2$ to $C_{20}$ alkyl group, $R^{15}$ may be a substituted or unsubstituted $C_1$ to $C_{20}$ alkyl group or a $C_6$ to $C_{20}$ aryl group that is substituted or unsubstituted with $C_2$ to $C_{10}$ alkoxy group, $L^{11}$ to $L^{13}$ may each independently be a substituted or unsubstituted $C_1$ to $C_{20}$ alkylene group, and m may be an integer from 1 to 20.

For example, the compound represented by Chemical Formula 2 may include a compound represented by Chemical Formula 2-1 or Chemical Formula 2-2.

[Chemical Formula 2-1]

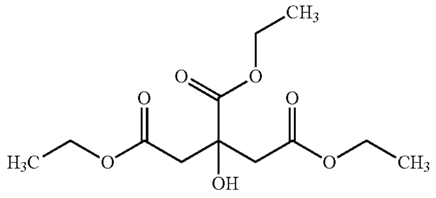

[Chemical Formula 2-2]

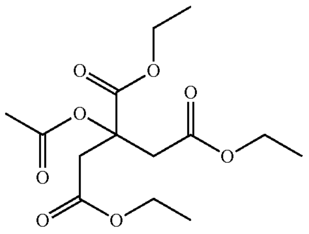

For example, the compound represented by Chemical Formula 3 may include a compound represented by any one of Chemical Formula 3-1 to Chemical Formula 3-4.

[Chemical Formula 3-1]

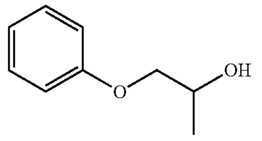

-continued

[Chemical Formula 3-2]

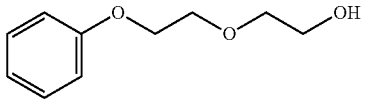

[Chemical Formula 3-3]

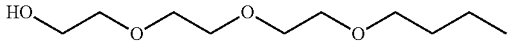

[Chemical Formula 3-4]

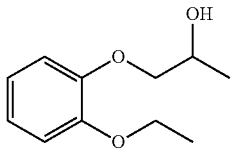

An amount of the solvent may be in a range of about 5 wt % to about 99.99 wt %, based on a total amount of the ink composition. For example, an amount of the solvent may be in a range of about 20 wt % to about 99.95 wt %, based on a total amount of the ink composition.

Polymerizable Monomer

The ink composition according to an embodiment may further include a polymerizable compound, if necessary. The polymerizable compound may be used by mixing monomers or oligomers commonly used in conventional curable compositions.

For example, the polymerizable compound may be a polymerizable monomer having a carbon-carbon double bond at its terminal end.

For example, the polymerizable compound may be a polymerizable monomer having at least one functional group represented by Chemical Formula A-1 or a functional group represented by Chemical Formula A-2 at its terminal end.

[Chemical Formula A-1]

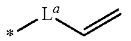

[Chemical Formula A-2]

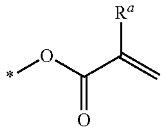

In Chemical Formula A-1 and Chemical Formula A-2, $L^a$ may be a substituted or unsubstituted $C_1$ to $C_{20}$ alkylene group, and $R^a$ may be a hydrogen atom or a substituted or unsubstituted $C_1$ to $C_{20}$ alkyl group.

The polymerizable compound may include at least one carbon-carbon double bond at a terminal end For example, a functional group represented by Chemical Formula A-1 or a functional group represented by Chemical Formula A-2, thereby forming a crosslinked structure with the surface-modifying compound. The crosslinked body thus formed may further enhance dispersion stability of the semiconductor nanorods by further doubling a type of steric hindrance effect.

For example, the polymerizable compound including at least one functional group represented by Chemical Formula A-1 at the terminal end may be divinyl benzene, triallyl cyanurate, triallyl isocyanurate, triallyl trimellitate, triallyl phosphate, triallyl phosphite, triallyl triazine, diallyl phthalate, or any combination thereof, but is not necessarily limited thereto.

For example, the polymerizable compound including at least one functional group represented by Chemical Formula A-2 at the terminal end may be ethylene glycol diacrylate, triethylene glycol diacrylate, 1,4-butanediol diacrylate, 1,6-hexane diol diacrylate, neopentyl glycol diacrylate, pentaerythritol diacrylate, pentaerythritol triacrylate, dipentaerythritol diacrylate, dipentaerythritol triacrylate, dipentaerythritol pentaacrylate, pentaerythritol hexaacrylate, bisphenol A diacrylate, trimethylolpropane triacrylate, novolac epoxy acrylate, ethylene glycol dimethacrylate, diethylene glycol dimethacrylate, triethylene glycol dimethacrylate, propylene glycol dimethacrylate, 1,4-butanediol dimethacrylate, 1,6-hexanediol dimethacrylate, polyfunctional epoxy (meth)acrylate, polyfunctional urethane (meth) acrylate, KAYARAD DPCA-20, KAYARAD DPCA-30, KAYARAD DPCA-60, KAYARAD DPCA-120, or KAYARAD DPEA-12 of Nippon Chemical Co., Ltd., or any combination thereof, but is not necessarily limited thereto.

The polymerizable compound may be used after being treated with an acid anhydride to impart better developability.

Polymerization Initiator

The curable composition according to an embodiment may further include a polymerization initiator, for example, a photopolymerization initiator, a thermal polymerization initiator, or any combination thereof, if necessary.

The photopolymerization initiator may be an initiator of the related art for a curable composition and may be, for example, an acetophenone-based compound, a benzophenone-based compound, a thioxanthone-based compound, a benzoin-based compound, a triazine-based compound, an oxime-based compound, an aminoketone-based compound, and the like, but is not necessarily limited thereto.

Examples of an acetophenone-based compound may include 2,2'-diethoxy acetophenone, 2,2'-dibutoxy acetophenone, 2-hydroxy-2-methylpropinophenone, p-t-butyltrichloro acetophenone, p-t-butyldichloro acetophenone, 4-chloro acetophenone, 2,2'-dichloro-4-phenoxy acetophenone, 2-methyl-1-(4-(methylthio)phenyl)-2-morpholinopropan-1-one, 2-benzyl-2-dimethylamino-1-(4-morpholinophenyl)-butan-1-one, and the like.

Examples of a benzophenone-based compound may include benzophenone, benzoyl benzoate, benzoyl methyl benzoate, 4-phenyl benzophenone, hydroxybenzophenone, acrylated benzophenone, 4,4'-bis(dimethyl amino)benzophenone, 4,4'-bis(diethylamino)benzophenone, 4,4'-dimethylaminobenzophenone, 4,4'-dichlorobenzophenone, 3,3'-dimethyl-2-methoxybenzophenone, and the like.

Examples of a thioxanthone-based compound may include thioxanthone, 2-methylthioxanthone, isopropyl thioxanthone, 2,4-diethyl thioxanthone, 2,4-diisopropyl thioxanthone, 2-chlorothioxanthone, and the like.

Examples of a benzoin-based compound may include benzoin, benzoin methyl ether, benzoin ethyl ether, benzoin isopropyl ether, benzoin isobutyl ether, benzyl dimethyl ketal, and the like.

Examples of a triazine-based compound may include 2,4,6-trichloro-s-triazine, 2-phenyl-4,6-bis(trichloromethyl)-s-triazine, 2-(3',4'-dimethoxystyryl)-4,6-bis(trichloromethyl)-s-triazine, 2-(4'-methoxynaphthyl)-4,6-bis (trichloromethyl)-s-triazine, 2-(p-methoxyphenyl)-4,6-bis (trichloromethyl)-s-triazine, 2-(p-tolyl)-4,6-bis(trichloro methyl)-s-triazine, 2-biphenyl-4,6-bis(trichloro methyl)-s-triazine, bis(trichloromethyl)-6-styryl-s-triazine, 2-(naphtho1-yl)-4,6-bis(trichloromethyl)-s-triazine, 2-(4-methoxynaphtho1-yl)-4,6-bis(trichloromethyl)-s-triazine, 2-4-bis(trichloromethyl)-6-piperonyl-s-triazine, 2-4-bis (trichloromethyl)-6-(4-methoxystyryl)-s-triazine, and the like.

Examples of an oxime-based compound may include O-acyloxime-based compound, 2-(O-benzoyloxime)-1-[4-(phenylthio)phenyl]-1,2-octandione, 1-(0-acetyloxime)-1-[9-ethyl-6-(2-methylbenzoyl)-9H-carbazol-3-yl]ethanone, O-ethoxycarbonyl-a-oxyamino-1-phenylpropan-1-one, and the like. Examples of the O-acyloxime-based compound may include 1,2-octandione, 2-dimethylamino-2-(4-methyl-benzyl)-1-(4-morpholin-4-yl-phenyl)-butan-1-one, 1-(4-phenylsulfanyl phenyl)-butane-1,2-dione-2-oxime-O-benzoate, 1-(4-phenylsulfanyl phenyl)-octane-1,2-dione-2-oxime-O-benzoate, 1-(4-phenylsulfanyl phenyl)-octan-1-oneoxime-O-acetate, 1-(4-phenylsulfanyl phenyl)-butan-1-oneoxime-O-acetate, and the like.

Examples of an aminoketone-based compound may include 2-benzyl-2-dimethylamino-1-(4-morpholinophenyl)-butanone-1, and the like.

The photopolymerization initiator may further include a carbazole-based compound, a diketone-based compound, a sulfonium borate-based compound, a diazo-based compound, an imidazole-based compound, a biimidazole-based compound, and the like besides the compounds.

The photopolymerization initiator may be used with a photosensitizer capable of causing a chemical reaction by absorbing light and becoming excited, and transferring its energy.

Examples of a photosensitizer may include tetraethylene glycol bis-3-mercapto propionate, pentaerythritol tetrakis-3-mercapto propionate, dipentaerythritol tetrakis-3-mercapto propionate, and the like.

The thermal polymerization initiator may include a peroxide, and examples thereof may include benzoyl peroxide, dibenzoyl peroxide, lauryl peroxide, dilauryl peroxide, di-tert-butyl peroxide, cyclohexane peroxide, methyl ethyl ketone peroxide, oxides, hydroperoxide (e.g., tert-butyl hydroperoxide, cumene hydroperoxide, etc.), dicyclohexyl peroxydicarbonate, 2,2-azo-bis(isobutyronitrile), t-butyl perbenzoate, 2,2'-azobis-2-methylpropionitrile, etc., but are not necessarily limited thereto, and any one in the related art may be used.

An amount of the polymerization initiator may be in a range of about 1 wt % to about 5 wt % based on a total amount of solid components constituting the ink composition. For example, an amount of the polymerization initiator may be in a range of about 2 wt % to about 4 wt %, based on the total amount of solid components constituting the ink composition. When the polymerization initiator is included within any of the above ranges, excellent reliability may be obtained due to sufficient curing during exposure or thermal curing.

Other Additives

The curable composition according to an embodiment may further include a polymerization inhibitor including a hydroquinone-based compound, a catechol-based compound, or any combination thereof, as needed. As the ink composition according to an embodiment further includes the hydroquinone-based compound, the catechol-based compound, or any combination thereof, crosslinking at room temperature may be prevented during exposure after printing (coating) the ink composition.

For example, the hydroquinone-based compound, the catechol-based compound, or the combination thereof may be hydroquinone, methyl hydroquinone, methoxyhydroquinone, t-butyl hydroquinone, 2,5-di-t-butyl hydroquinone, 2,5-bis(1,1-dimethylbutyl) hydroquinone, 2,5-bis (1,1,3,3-tetramethylbutyl) hydroquinone, catechol, t-butyl catechol, 4-methoxyphenol, pyrogallol, 2,6-di-t-butyl-4-methylphenol, 2-naphthol, tris(N-hydroxy-N-nitrosophenylaminato-O, O')aluminum, or any combination thereof, but are not necessarily limited thereto.

The hydroquinone-based compound, catechol-based compound, or combination thereof may be used in a form of a dispersion, and an amount of the polymerization inhibitor in a form of the dispersion may be in a range of about 0.001 wt % to about 1 wt %, based on a total amount of the ink composition. For example, an amount of the polymerization inhibitor in a form of the dispersion may be in a range of about 0.01 wt % to about 0.1 wt %, based on a total amount of the ink composition. When the polymerization inhibitor is included within any of the above ranges, issues associated with a passage of time at room temperature may be solved and, sensitivity deterioration and a surface delamination phenomenon may be inhibited.

In an embodiment, the ink composition may include: malonic acid; 3-amino-1,2-propanediol; a silane-based coupling agent; a leveling agent; a fluorine-based surfactant; or any combination thereof, in addition to the polymerization inhibitor, as needed.

For example, the ink composition may further include a silane-based coupling agent having a reactive substituent such as a vinyl group, a carboxyl group, a methacryloxy group, an isocyanate group, an epoxy group, or the like in order to improve close contacting properties with a substrate.

Examples of a silane-based coupling agent may include trimethoxysilyl benzoic acid, γ-methacryl oxypropyl trimethoxysilane, vinyl triacetoxysilane, vinyl trimethoxysilane, γ-isocyanate propyl triethoxysilane, γ-glycidoxy propyl trimethoxysilane, ρ-epoxycyclohexyl)ethyltrimethoxysilane, and the like, and these may be used alone or in a mixture of two or more.

The silane-based coupling agent may be used in an amount in a range of about 0.01 parts by weight to about 10 parts by weight, based on 100 parts by weight of the ink composition. When the silane-based coupling agent is included within the range, close contacting properties, storage capability, and the like may be improved.

The ink composition may further include a surfactant, such as a fluorine-based surfactant, to improve coating properties and prevent defect formation, if necessary.

Examples of a fluorine-based surfactant may include BM-1000®, BM-1100@, and the like of BM Chemie Inc.; MEGAFACE F 142D®, MEGAFACE F 172®, MEGAFACE F 173®, MEGAFACE F 183®, and the like of Dainippon Ink Kagaku Kogyo Co., Ltd.; FULORAD FC-135®, FULORAD FC-170C®, FULORAD FC-430®, FULORAD FC-431®, and the like of Sumitomo 3M Co., Ltd.; SURFLON S-112®, SURFLON S-113®, SURFLON S-131®, SURFLON S-141®, SURFLON S-145®, and the like of ASAHI Glass Co., Ltd.; SH-28PA®, SH-190®, SH-193®, SZ-6032®, SF-8428®, and the like of Toray Silicone Co., Ltd.; and F-482, F-484, F-478, F-554, and the like of DIC Co., Ltd.

An amount of the fluorine-based surfactant may be in a range of about 0.001 parts by weight to about 5 parts by weight, based on 100 parts by weight of the ink composition. When the fluorine-based surfactant is included within the above range, coating uniformity is secured, stains do not occur, and wettability to a glass substrate is excellent.

The ink composition may further include other additives such as an antioxidant, a stabilizer, and the like in an amount (e.g., a predetermined or a selectable amount), unless properties are deteriorated.

In an embodiment, the ink composition may be an ink composition for an electrophoresis apparatus.

Another embodiment provides a layer which may be manufactured using the ink composition.

Another embodiment provides an electrophoresis apparatus which may include the layer.

Another embodiment provides a display device which may include the layer.

Hereinafter, embodiments are illustrated in more detail with reference to examples. These examples, however, are not in any sense to be interpreted as limiting the scope of the disclosure.

(Preparation of Curable Composition)

Example 1

40 ml of 2-[methoxy(polyethyleneoxy)$_6$ propyl] trimethoxysilane (CAS #: 65994-07-2, $EO_{6-9}$-CA, 1% solution in PGMEA) is reacted on a nanorod-patterned GaN wafer (4 inches) at room temperature for 15 hours. After the reaction, the wafer is dipped in 50 ml of acetone for 5 minutes to remove excess ligand, and the surface of the wafer is rinsed by using 40 ml of acetone. The washed wafer is put with 35 ml of GBL in a 27 kW bath-type sonicator and sonicated for 5 minutes to separate the rod from the wafer surface through the sonication. The separated rod is put in a FALCON tube for centrifugation, and 10 ml of GBL is added thereto to additionally wash the rod on the bath surface. After discarding a supernatant through the centrifugation at 4000 rpm for 10 minutes, precipitates are redispersed in 40 ml of acetone to filter out foreign matters with a 10 μm mesh filter. After the additional centrifugation (4000 rpm, 10 minutes), the precipitates are dried in a drying oven (100° C., for 1 hour) and weighed, so that 0.05 w/w % thereof are dispersed in triethy 2-acetyl citrate (TEC-Ac), preparing an ink composition.

Example 2

An ink composition is prepared in the same method as in Example 1 except that 2-[methoxy(polyethyleneoxy)$_9$ propyl]trimethoxysilane (CAS #: 65994-07-2, $EO_9$-CA, 1% solution in PGMEA) is used instead of the 2-[methoxy (polyethyleneoxy)$_6$ propyl]trimethoxysilane as a ligand.

Comparative Example 1

An ink composition is prepared in the same method as in Example 1 except that a ligand is not used.

Comparative Example 2

An ink composition is prepared in the same method as in Example 1 except that octadecyl trimethoxysilane (CAS #: 3069-42-9, GD-CA, 1% solution in dodecane) is used instead of the 2-[methoxy(polyethyleneoxy)$_6$ propyl] trimethoxysilane as a ligand.

Comparative Example 3

An ink composition is prepared in the same method as in Example 1 except that triethoxy (2, 4, 4-trimethyl pentyl) silane (CAS #: 35435-21-3, TMPCA, 1% solution in PGMEA) is used instead of the 2-[methoxy(polyethyleneoxy)$_6$ propyl]trimethoxysilane as a ligand.

Each structure of the ligands of Examples 1 and 2 and Comparative Examples 2 and 3 is shown in Table 1.

TABLE 1

| | Ligand structure |
|---|---|
| Example 1 | 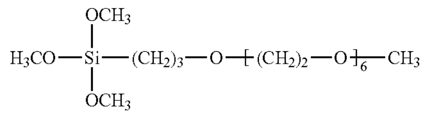 |
| Example 2 | 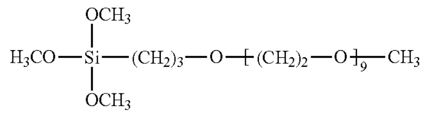 |
| Comparative Example 2 | 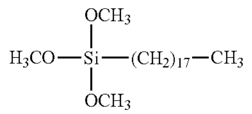 |
| Comparative Example 3 | 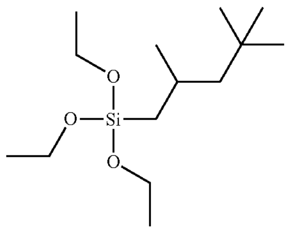 [SMILES: CCO[Si](CC(C)CC(C)(C)C)(OCC)OCC] |

Evaluation

The ink compositions of Examples 1 and 2 and Comparative Examples 1 to 3 are evaluated with respect to a precipitation speed by using Turbiscan and dielectrophoretic characteristics by using a backscattering (BS) reduction rate at 8 hours later after measuring the precipitation speed, TSI (turbiscan stability index) in Turbiscan, and the like. The results are shown in Table 2.

TABLE 2

| | Ex. 1 | Ex. 2 | Comp. Ex. 1 | Comp. Ex. 2 | Comp. Ex. 3 |
|---|---|---|---|---|---|
| Precipitation speed (mm/h) | 0.321 | 0.298 | 0.323 | 0.562 | 0.352 |
| Dielectrophoretic characteristics (%) | 87 | 90 | 80 | 52 | 72 |

Referring to Table 2, Examples 1 and 2 using a surface-modified semiconductor nanorod as a hydrophilic ligand including an alkylene oxide structural unit exhibit an improved precipitation speed, compared with Comparative Examples 1 to 3, and in addition, exhibit excellent dielectrophoretic characteristics (an improved BS reduction rate, which is not shown in Table 2).

Embodiments have been disclosed herein, and although terms are employed, they are used and are to be interpreted in a generic and descriptive sense only and not for the purposes of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the claims.

What is claimed is:

1. An ink composition, comprising:

a semiconductor nanorod including at least one functional group each independently represented by one of Chemical Formula 1-1 to Chemical Formula 1-3; and a solvent:

[Chemical Formula 1-1]

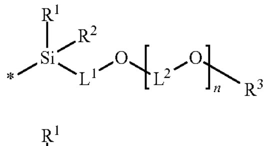

[Chemical Formula 1-2]

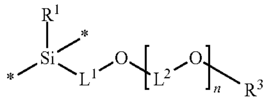

[Chemical Formula 1-3]

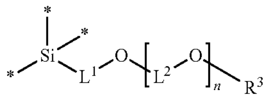

wherein in Chemical Formula 1-1-to Chemical Formula 1-3, $R^1$ to $R^3$ are each independently hydrogen, a substituted or unsubstituted $C_1$ to $C_{20}$ alkyl group, a substituted or unsubstituted $C_1$ to $C_{20}$ alkoxy group, or a substituted or unsubstituted $C_6$ to $C_{20}$ aryl group, and $L^1$ and $L^2$ are each independently a substituted or unsubstituted $C_1$ to $C_{20}$ alkylene group, in Chemical Formula 1-1, n is an integer from 6 to 9, in Chemical Formula 1-2 and Chemical Formula 1-3, n is an integer from 0 to 20, and

* represents a bond to the semiconductor nanorod.

2. The ink composition of claim 1, wherein $L^1$ and $L^2$ are each independently an unsubstituted $C_1$ to $C_{20}$ alkylene group.

3. The ink composition of claim 2, wherein $L^1$ and $L^2$ are each independently represented by Chemical Formula L-1 or Chemical Formula L-2:

[Chemical Formula L-1]

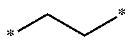

[Chemical Formula L-2]

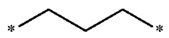

wherein in Chemical Formula L-1 and Chemical Formula L-2,

* indicates a bonding site to a neighboring atom.

4. The ink composition of claim 1, wherein $L^1$ and $L^2$ are each independently a substituted $C_1$ to $C_{20}$ alkylene group.

5. The ink composition of claim 4, wherein $L^1$ and $L^2$ are each independently represented by one of Chemical Formula L-3 to Chemical Formula L-7:

[Chemical Formula L-3]

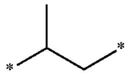

[Chemical Formula L-4]

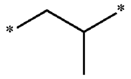

[Chemical Formula L-5]

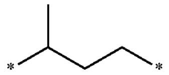

[Chemical Formula L-6]

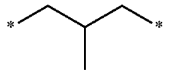

[Chemical Formula L-7]

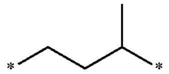

wherein in Chemical Formula L-3 to Chemical Formula L-7,

* indicates a bonding site to a neighboring atom.

6. The ink composition of claim 1, wherein $R^1$ and $R^2$ are each independently a substituted or unsubstituted $C_1$ to $C_{20}$ alkoxy group.

7. The ink composition of claim 1, wherein $R^3$ is a substituted or unsubstituted $C_1$ to $C_{20}$ alkyl group.

8. The ink composition of claim 1, wherein the semiconductor nanorod has a diameter in a range of about 300 nm to about 900 nm.

9. The ink composition of claim 1, wherein the semiconductor nanorod has a length in a range of about 4 μm to about 6 μm.

10. The ink composition of claim 1, wherein the semiconductor nanorod includes a GaN-based compound, an InGaN-based compound, or a combination thereof.

11. The ink composition of claim 1, wherein the semiconductor nanorod has a surface coated with a metal oxide.

12. The ink composition of claim 11, wherein the metal oxide includes alumina, silica, or a combination thereof.

13. The ink composition of claim 11, wherein the at least one functional group each independently represented by one of Chemical Formula 1-1 to Chemical Formula 1-3 is linked to the metal oxide on the surface of the semiconductor nanorod.

14. The ink composition of claim 1, wherein an amount of the semiconductor nanorod in the ink composition is in a range of about 0.01 wt % to about 10 wt %, based on a total amount of the ink composition.

15. The ink composition of claim 1, wherein the solvent is a citrate-based solvent.

16. The ink composition of claim 1, wherein the ink composition further includes: malonic acid; 3-amino-1,2-propanediol; a silane-based coupling agent; a leveling agent; a fluorine-based surfactant; or a combination thereof.

17. The ink composition of claim 1, wherein the ink composition is an ink composition for an electrophoresis apparatus.

18. A layer manufactured using an ink composition, the ink composition comprising:

a semiconductor nanorod including at least one functional group each independently represented by one of Chemical Formula 1-1 to Chemical Formula 1-3; and a solvent:

[Chemical Formula 1-1]

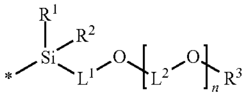

[Chemical Formula 1-2]

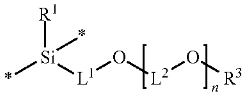

[Chemical Formula 1-3]

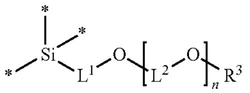

wherein in Chemical Formula 1-1 to Chemical Formula 1-3, $R^1$ to $R^3$ are each independently hydrogen, a substituted or unsubstituted $C_1$ to $C_{20}$ alkyl group, a substituted or unsubstituted $C_1$ to $C_{20}$ alkoxy group, or a substituted or unsubstituted $C_6$ to $C_{20}$ aryl group, and $L^1$ and $L^2$ are each independently a substituted or unsubstituted $C_1$ to $C_{20}$ alkylene group, in Chemical Formula 1-1 , n is an integer from 6 to 9 , in Chemical Formula 1-2 and Chemical Formula 1-3 , n is an integer from 0 to 20, and represents a bond to the semiconductor nanorod.

19. An electrophoresis apparatus comprising the layer of claim 18.

20. A display device comprising the layer of claim 18.

* * * * *